United States Patent
Furuichi et al.

(10) Patent No.: US 8,754,551 B2
(45) Date of Patent: Jun. 17, 2014

(54) ELECTRIC POWER SUPPLY CONTROL CIRCUIT

(75) Inventors: Masahiko Furuichi, Yokkaichi (JP); Seiji Takahashi, Yokkaichi (JP)

(73) Assignees: Autonetworks Technologies, Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 733 days.

(21) Appl. No.: 13/123,389

(22) PCT Filed: Jan. 29, 2010

(86) PCT No.: PCT/JP2010/051195
§ 371 (c)(1),
(2), (4) Date: Apr. 8, 2011

(87) PCT Pub. No.: WO2010/087426
PCT Pub. Date: Aug. 5, 2010

(65) Prior Publication Data
US 2011/0193414 A1    Aug. 11, 2011

(30) Foreign Application Priority Data

Jan. 30, 2009  (JP) ................................. 2009-020513

(51) Int. Cl.
*B60L 1/00* (2006.01)
*B60L 3/00* (2006.01)
*H02G 3/00* (2006.01)
*H01H 83/00* (2006.01)
*H01H 35/00* (2006.01)

(52) U.S. Cl.
USPC ............ 307/126; 307/9.1; 307/10.1; 307/99; 307/116

(58) Field of Classification Search
None
See application file for complete search history.

(56) References Cited

U.S. PATENT DOCUMENTS

| 6,710,698 B1 | 3/2004 | Jehlicka et al. |
| 7,116,009 B2 * | 10/2006 | Tamai et al. ................ 307/10.7 |

FOREIGN PATENT DOCUMENTS

| DE | 199 41 699 A1 | 3/2001 |
| JP | A-11-85293 | 3/1999 |
| JP | A-2001-217696 | 8/2001 |
| JP | A-2002-341978 | 11/2002 |
| JP | A-2007-312543 | 11/2007 |

OTHER PUBLICATIONS

Office Action issued in German Patent Application No. 112010000432.3 issued Mar. 18, 2013 (with translation).
International Search Report for International Patent Application No. PCT/JP2010/051195, mailed on May 11, 2010.
Jan. 20, 2014 Office Action issued in Chinese Patent Application No. 201080003576.3 (with English translation).

* cited by examiner

*Primary Examiner* — Jared Fureman
*Assistant Examiner* — Aqeel Bukhari
(74) *Attorney, Agent, or Firm* — Oliff PLC

(57) ABSTRACT

An electric power supply control circuit includes a bypass circuit connected in parallel with a semiconductor switch. Upon a control circuit being in an inactive state while a load being in a non-electrifying state or in a standby state, the bypass circuit connects a power source to the load. The bypass circuit includes a electrifying decision circuit that generates an activation signal for activating the control circuit in accordance with the load being put in an operation state. The electrifying decision circuit supplies the activation signal to the control circuit so as to turn on the semiconductor switch and allow electric power supply to the load through an electrifying line.

11 Claims, 3 Drawing Sheets

ELECTRIC POWER SUPPLY CONTROL CIRCUIT

TECHNICAL FIELD

The present invention relates to electric power supply control circuits or, specifically, to power saving when a load is in a non-electrifying state or in a standby state.

BACKGROUND ART

Conventionally, electric power supply control circuits are provided. The circuit has: a electrifying line to be connected between a power source and a load; and a high-power semiconductor switching device, such as a power MOSFET, provided along the electrifying line. The circuit is configured to turn on/off the semiconductor switching device so as to control current supply to the load. One of such an electric power supply control circuit is configured to, when overcurrent passes, control electric potential at a control terminal of the semiconductor switching device so as to turn off the semiconductor switching device, thereby shutting off power-supply. In other words, the semiconductor switching device is used also as a semiconductor fuse that protects the electrifying line (the wire) then.

[Patent Document 1] Japanese Unexamined Patent Application Publication No. 2001-217696

DISCLOSURE OF THE INVENTION

Problem to be Solved by the Invention

Note here that, in a case of using the semiconductor switching device as the semiconductor fuse in the upstream of some load that needs power supply, voltage application or power supply from the power source to the load is required even when the load is in a non-electrifying state or in a standby state. For example, in a case where the load is an ECU (engine control unit) mounted in a vehicle, driving-current application to the semiconductor switching device and power supply to the control circuit is necessary in order to maintain the ECU in the standby state. Then, the electric power supply control circuit consumes a predetermined electric power even when the load is in the non-electrifying state or in the standby state. Therefore, there is a need for power saving in an electric power supply control circuit when the load is in the non-electrifying state or in the standby state.

Means for Solving the Problem

The present invention was completed on the basis of the above circumstances. An electric power supply control circuit in accordance with the present invention is to be connected to a electrifying line that supplies electric power from a power source to a load. The electric power supply control circuit includes a semiconductor switch and a control circuit. The semiconductor switch is for turning on and off supply of the electric power. The control circuit is for controlling turning on and off of the semiconductor switch while protecting the semiconductor switch and the electrifying line. The electric power supply control circuit includes: a bypass circuit connected in parallel with the semiconductor switch. Upon the control circuit being in an inactive state while the load being in a non-electrifying state or in a standby state, the bypass circuit connects the power source to the load. The bypass circuit includes a electrifying decision circuit that generates an activation signal for activating the control circuit in accordance with the load being put in an operation state. The electrifying decision circuit supplies the activation signal to the control circuit so as to turn on the semiconductor switch and allow electric power supply to the load through the electrifying line.

With the present invention, when the load is in the non-electrifying state or in the standby state, electric power can be supplied to the load through the bypass circuit. This can make it possible to significantly reduce the power consumption by the control circuit and the semiconductor switch when the load is in the non-electrifying state or in the standby state to the standby power consumption by the control circuit alone. Therefore, power can be suitably saved when the load is in the non-electrifying state or in the standby state. Note that the term "non-electrifying state" of the load represents a state in which the load is not in the operation state and load current is not passing through the load. Note that the term "non-electrifying state" includes also a state in which voltage is simply applied to the load. The term "standby state" of the load represents a state in which the load is on standby for predetermined operation. In the "standby state", minute current such as standby current is passing through the load.

EXPLANATION OF REFERENCE CHARACTERS

Figure 1:
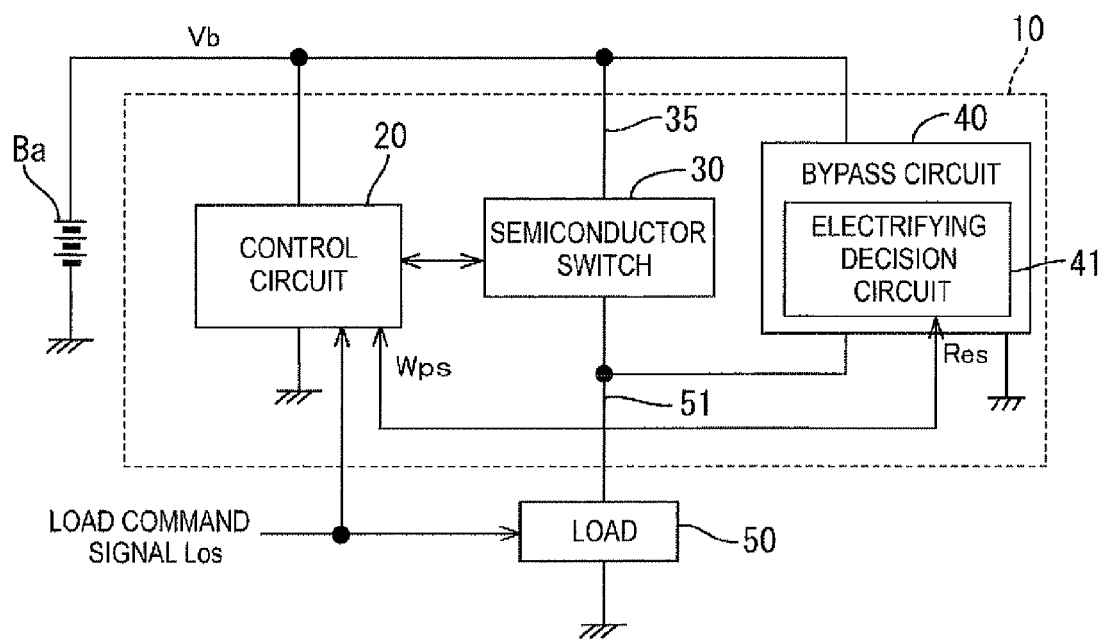
FIG. 1 is a schematic block diagram of an electric power supply control circuit of an embodiment in accordance with the present invention.

10 . . . electric power supply control circuit
20 . . . control circuit
22 . . . current detection and wire-temperature calculation circuit (current detection circuit, temperature calculation circuit, non-electrifying decision circuit)
24 . . . latch reset circuit (non-electrifying decision circuit)
30 . . . semiconductor switch
31 . . . main switch
40 . . . bypass circuit
41 . . . electrifying decision circuit
42 . . . latch circuit
43 . . . bypass inhibiting circuit
45 . . . bypass
50 . . . ECU (load)
51 . . . electric wire (electrifying line)
C1 . . . capacitor
Los . . . load command signal (command signal)
Tr1 . . . transistor (circuit shut-off device)
Tr2 . . . transistor (pass shut-off device)
It . . . load current
R2 . . . resistor
Wps . . . wake-up signal (activation signal)

BEST MODE FOR CARRYING OUT THE INVENTION

Embodiment

Figure 2:
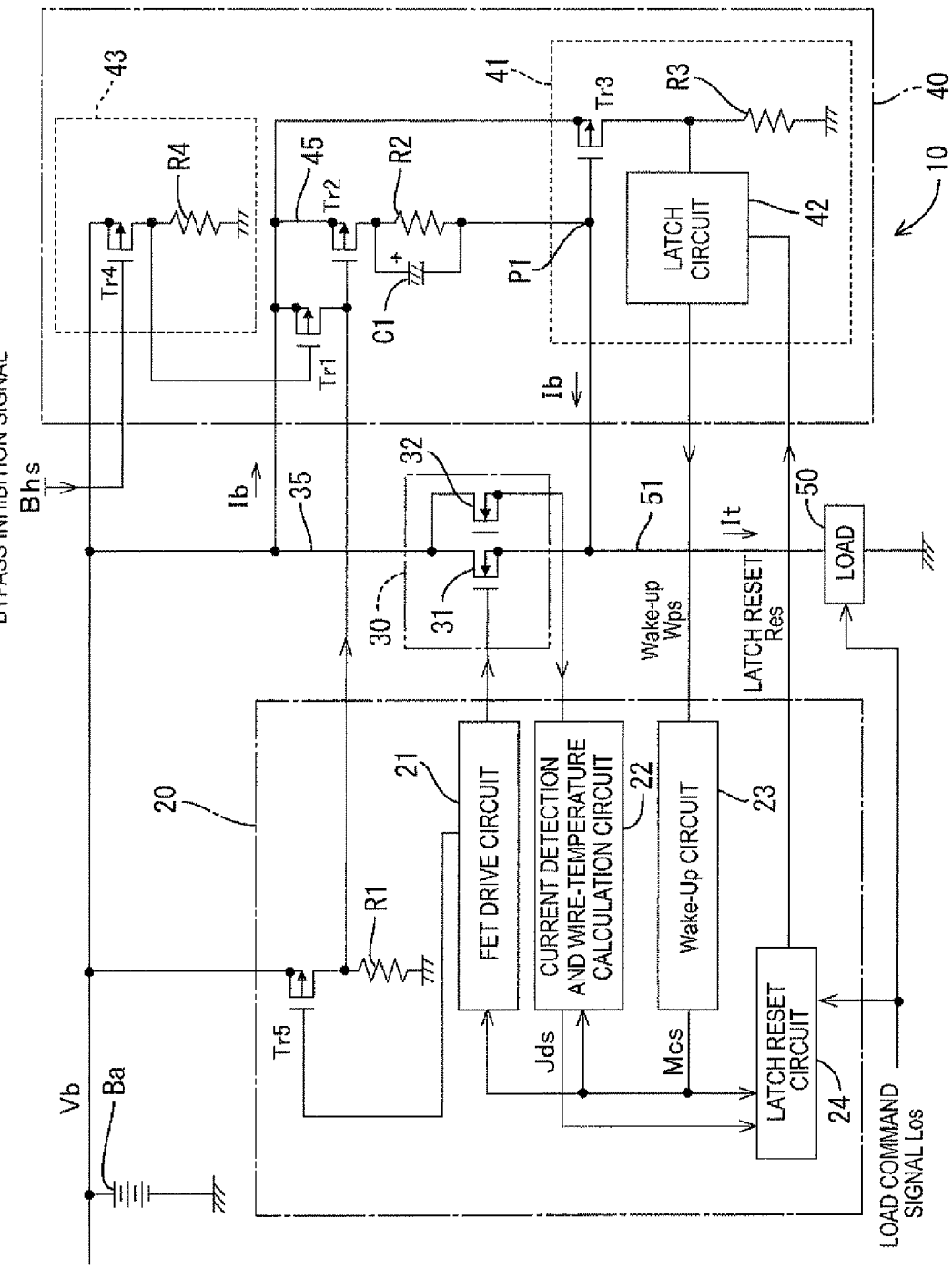
FIG. 2 is a more detailed block diagram of the electric power supply control circuit.
Figure 3:
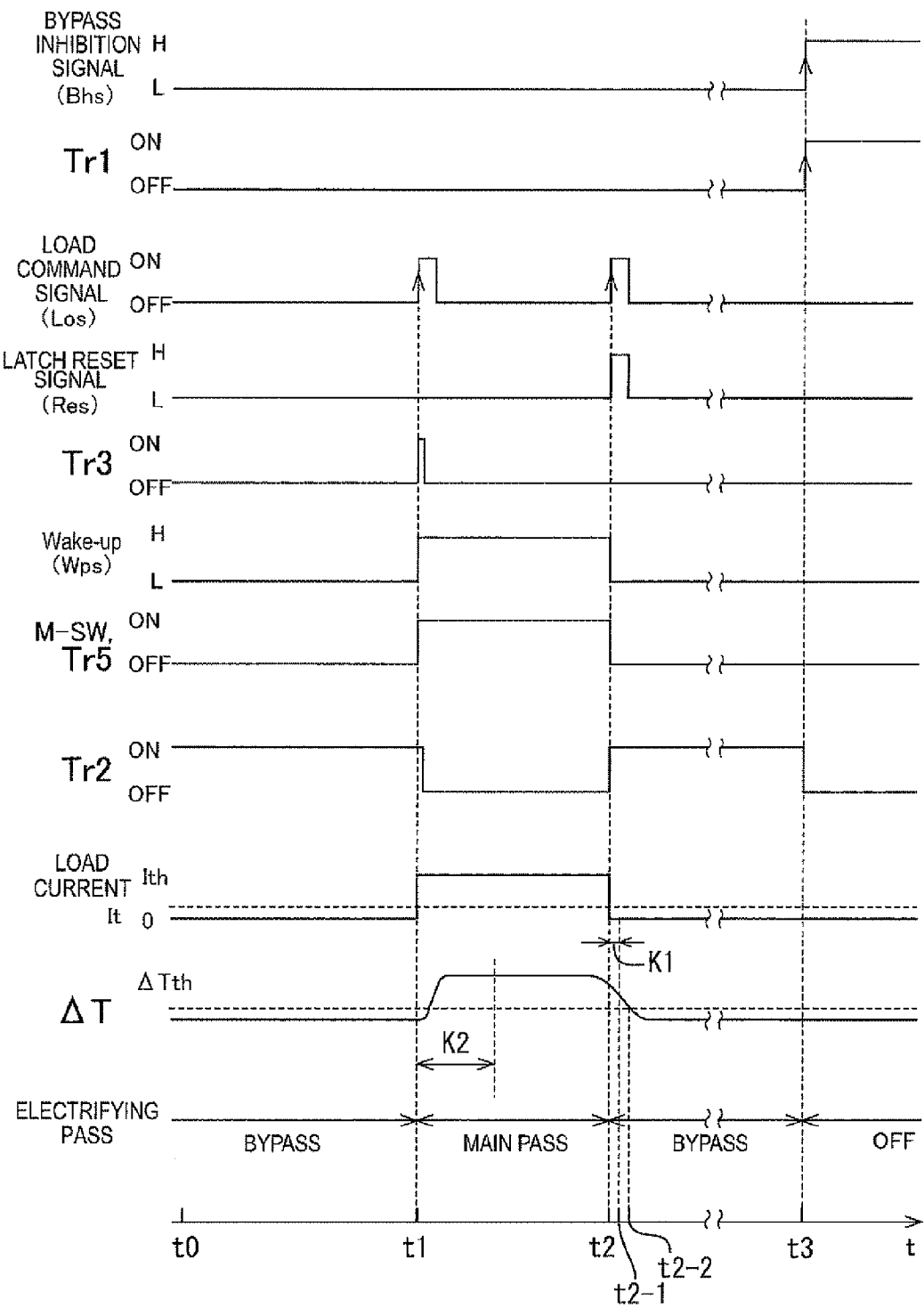
FIG. 3 is a time chart schematically illustrating time change of signals of an embodiment.

An embodiment in accordance with the present invention will be explained with reference to FIGS. 1 through 3. FIG. 1 is a schematic block diagram of an electric power supply control circuit 10 of an embodiment in accordance with the present invention. FIG. 2 is a more detailed block diagram of the electric power supply control circuit 10. FIG. 3 is a time chart schematically illustrating time change of each signal of an embodiment.

1. Circuit Configuration

As illustrated in FIG. 1, the semiconductor switch 30 is connected to an electrifying line 51 that supplies power from a power source Ba to a load 50. The electric power supply control circuit 10 includes a semiconductor switch 30 and a control circuit 20. The semiconductor switch 30 turns on/off supply of power. The control circuit 20 controls turning on/off of the semiconductor switch 30 while protecting the semiconductor switch 30 and the electrifying line 51. The electric power supply control circuit 10 further includes a bypass circuit 40 that is connected in parallel with the semiconductor switch 30. When the control circuit 20 is in an inactive state while the load 50 is in a non-electrifying state or in a standby state, the bypass circuit 40 connects the battery power source Ba to the load 50.

The bypass circuit 40 includes a electrifying decision circuit 41. The electrifying decision circuit 41 detects the load 50 being put in an operation state and, in accordance with the detection of the operation state of the load 50, activates the control circuit 20. The electrifying decision circuit 41 supplies activation signal Wps to the control circuit 20. Then, the semiconductor switch 30 is turned on, so that power is applied from the power source Ba to the load 50 through the electrifying line 51. In this embodiment, the electric power supply control circuit 10 is mounted in a vehicle; the power source Ba is a battery; and the electric power supply control circuit 10 controls driving of the ECU as the load 50 through a wire as the electrifying line 51.

Next, each component of the electric power supply control circuit 10 will be described with reference to FIG. 2. The control circuit 20 includes a FET drive circuit 21, a current detection and wire-temperature calculation circuit 22, a wake-up circuit 23, a latch reset circuit 24 (an illustration of a "non-electrify state decision circuit"), and a transistor Tr5, etc.

The FET drive circuit 21 controls turning on/off of a main switch 31 of the semiconductor switch 30 and the transistor Tr5.

The current detection and wire-temperature calculation circuit 22 is connected to a sense transistor 32 of the semiconductor switch 30. The current detection and wire-temperature calculation circuit 22 detects load current It to the load 50 and calculates temperature rise $\Delta T$ in the electrifying line (wire) 51 from the amount of the detected load current It. When the load current It becomes equal to or lower than a threshold Ith, or when the temperature rise $\Delta T$ becomes equal to or lower than a threshold $\Delta T$th on or after a predetermined time (see K2 in FIG. 3) at which the temperature rise $\Delta T$ in the electrifying line (wire) 51 saturates due to electrifying the load 50, the current detection and wire-temperature calculation circuit 22 generates decision signal Jds for causing decision that the load 50 is in the non-electrifying state or in the standby state. Then, the current detection and wire-temperature calculation circuit 22 supplies the decision signal Jds to the latch reset circuit 24.

The wake-up circuit 23 switches the state of the control circuit 20 from the standby state to the active state in accordance with the wake-up signal Wps (an illustration of an activation signal) from the bypass circuit 40. On receipt of the wake-up signal Wps, the wake-up circuit 23 generates state switching signal Mcs and supplies the state switching signal Mcs to the FET drive circuit 21, the current detection and wire-temperature calculation circuit 22, and the latch reset circuit 24.

On receipt of the decision signal Jds or load command signal Los for setting the load 50 to the non-electrifying state (off state) or the standby state, the latch reset circuit 24 decides that the load 50 is in the non-electrifying state or in the standby state. Then, in order to switch the control circuit 20 from the active state to the standby state, the latch reset circuit 24 generates a latch reset signal Res and supplies the latch reset signal Res to a latch circuit 42 of the bypass circuit 40.

The semiconductor switch 30 includes the main switch 31 and the sense transistor 32. The main switch 31 supplies power to the load 50. The sense transistor 32 detects the load current It. The main switch 31 and the sense transistor 32 are configured by, for example, N-channel FETs (field-effect transistors).

The bypass circuit 40 includes the electrifying decision circuit 41, a bypass inhibiting circuit 43, a bypass 45, a transistor Tr1 (an illustration of a "circuit shut-off device"), a transistor Tr2 (a pass shut-off device), a resistor R2, a capacitor C1, etc. Note that the bypass circuit 40 can be configured without including the transistor Tr1 and the bypass inhibiting circuit 43.

The electrifying decision circuit 41 includes the latch circuit 42, a transistor Tr3, and a resistor R3. The transistor Tr3 is configured by, for example, a P-channel FET. When the transistor Tr2 turns on and pass voltage (see a point P1 in FIG. 2) reaches a range of ON voltage (corresponding to a "value within a predetermined range"), the transistor Tr3 turns on. Then, the latch circuit 42 generates the wake-up signal Wps as latch signal by the potential generated at an end of the resistor R3. Then, the latch circuit 42 supplies the wake-up signal Wps to the wake-up circuit 23 of the control circuit 20.

The transistor Tr2 is configured by, for example, a P-channel FET. On/off control of the transistor Tr2 is performed by the transistor Tr1 and the transistor Try of the control circuit 20. When the transistor Tr2 is turned off, the bypass 45 is shut off.

The resistor R2 is provided so as to form the voltage (pass voltage) that turns on the transistor Tr2 at the endpoint P1 of the bypass 45. The resistor R2 has a resistance value for being capable of limiting the load current It so that the current It (load current) passing through the electrifying line 51 is equal to or lower than a current value whereat the load current It does not damage the electrifying line 51 in case the load 50 is short-circuited.

The capacitor C1 is connected in parallel with the resistor R2. The capacitor C1 smoothes the signal via the bypass 45. In other words, the capacitor C1 is provided to prevent the latch circuit 42 from malfunction due to pulse noise entering the bypass 45. Note that the capacitor C1 may be omitted.

The bypass inhibiting circuit 43 includes a transistor Tr4 and a resistor R4. The transistor Tr4 is configured by, for example, a P-channel FET. The bypass inhibiting circuit 43 controls the transistor Tr1 in accordance with bypass inhibition signal Bhs (an illustration of a "predetermined instruction signal") so as to shut off the bypass circuit 40. For example, when the vehicle is to be shipped for transportation, the bypass inhibiting circuit 43 turns on the transistor Tr1 so as to turn off the transistor Tr2, thereby shutting off operation of the bypass circuit 40.

2. Operation of Power Supply Control Circuit

Next, operation of the electric power supply control circuit 10 of this embodiment will be explained with reference to the time chart of FIG. 3.

Suppose that the control circuit 20 and the load (ECU) 50 are now in the standby state while power is being supplied from the bypass 45 to the ECU 50 (see time points t0-t1 in FIG. 3). Suppose further that, in this state, the load command signal Los is supplied from, for example, a remote controller to the ECU 50 at the time point t1 in FIG. 3 so as to turn the load (ECU) 50 from the standby state to the electrifying state (the operation state).

Then, by the state change of the ECU 5, a bypass current Ib passing through the bypass 45 increases, along with which a voltage drop across the resistor R2 in the bypass circuit 40 increases. When the voltage drop has reached a value equal or higher than a predetermined value, i.e. equal to or higher than the ON voltage of the transistor Tr3 of the electrifying decision circuit 41, the transistor Tr3 turns on. On turning on of the transistor Tr3, the terminal voltage of the resistor R3 of the electrifying decision circuit 41 increases, so that the latch circuit 42 operates. In other words, the latch circuit 42 validates the wake-up signal Wps. For example, as illustrated in FIG. 3, the latch circuit 42 changes the wake-up signal Wps from low level to high level.

Then, on receipt of the wake-up signal Wps, the wake-up circuit 23 generates the state switching signal Mcs and supplies the state switching signal Mcs to the FET drive circuit 21, the current detection and wire-temperature calculation circuit 22, and the latch reset circuit 24. In accordance with the state switching signal Mcs, the FET drive circuit 21 turns on the main switch 31 and, immediately thereafter, turns on the transistor Tr5. The transistor Tr5 is configured by, for example, a P-channel FET. On turning on of the transistor Tr5, the transistor Tr2 of the bypass circuit 40 is turned off, so that the bypass 45 is shut off. In other words, the electrifying pass of the ECU 50 is switched from the bypass 45 to the main pass 35.

Next, suppose that the load command signal Los for putting the ECU 50 from the electrifying state to the standby state is supplied to the ECU 50 and the latch reset circuit 24 at time point t2 in FIG. 3. Then, the latch reset circuit 24 supplies the latch reset signal Res to the latch circuit 42 of the bypass circuit 40 so that the latch circuit 42 changes the wake-up signal Wps from high level to low level, thereby invalidating the wake-up signal Wps.

On receipt of the invalidated wake-up signal Wps, the wake-up circuit 23 generates the state switching signal Mcs for switching the state of the control circuit 20 from the active state to the standby state. Then, the wake-up circuit 23 supplies the state switching signal Mcs to the FET drive circuit 21, the current detection and wire-temperature calculation circuit 22, and the latch reset circuit 24. In accordance with the state switching signal Mcs, the FET drive circuit 21 turns off the main switch 31 and, immediately thereafter, turns off the transistor Tr5. On turning off of the transistor Tr5, the transistor Tr2 of the bypass circuit 40 is turned on, so that the bypass 45 is put in a conduction state. In other words, the electrifying pass of the ECU 50 is switched from the main pass 35 to the bypass 45.

Furthermore, when the ECU 5 is not to be used for a long period of time such as when the vehicle is to be shipped for transportation, the high-level bypass inhibition signal Ehs, for example, is supplied to the gate of the transistor Tr4 of the bypass inhibiting circuit 43 as illustrated at time point t3 in FIG. 3. For example, the gate of the transistor Tr4 is pulled up. Then, because the transistor Tr1 turns on so that the transistor Tr2 is turned off, the bypass 45 is shut off. Then, the main pass 35 also is shut off. Accordingly, the electrifying pass to the ECU 50 is completely shut off.

3. Effect of Embodiment

When the control circuit 20 is in the inactive state (such as in the standby state) while the ECU (load) 50 is in the standby state, the bypass circuit 40 connects the battery Ba and the ECU 50 through the bypass 45 so as to supply the power of the battery Ba to the ECU 50. Then, when the ECU 50 is put in the active state, the semiconductor switch 30 is turned on so that the power is supplied to the ECU 50 through the main pass 35 while the bypass 45 is shut off. This makes it possible to significantly reduce the power consumption by the control circuit 20 and the semiconductor switch 30 when the ECU 50 is in the standby state to only the standby power consumption by the control circuit 20.

Furthermore, the bypass 45 can be shut off by the bypass inhibiting circuit 43. Therefore, when the ECU 50 is to be completely turned off, e.g. when the vehicle is to be shipped for transportation, power consumption through the bypass circuit 40 can be reduced.

Other Embodiments

The present invention is not limited to the embodiment explained above with reference to the drawings. For example, following embodiments are also included within the scope of the present invention.

(1) In the above embodiment, when the latch reset circuit 24 (the non-electrify state decision circuit) decides that the ECU (load) 50 is in the standby state and turns off the semiconductor switch 30 so as to put the control circuit 20 itself in the inactive state, the latch reset circuit 24 decides that the ECU (load) 50 is in the non-electrifying state illustratively on the basis of the load command signal Los. The present invention is not limited to this.

For example, as illustrated in FIG. 3, the latch reset circuit 24 may decide that the ECU 50 is in the non-electrifying state by the load current It being equal to or lower than the threshold Ith. In this case, the non-electrifying state of the ECU 50 may be decided by a state in which the load current It is equal to or lower than the threshold Ith continues for a predetermined time period K1 (see time point t2-1 in FIG. 3).

Or, as illustrated in FIG. 3, the latch reset circuit 24 may decide that the ECU 50 is in the non-electrifying state on the basis that the temperature rise calculation value in the electrifying line 51 is equal to or lower than the threshold $\Delta$Tth on or after the predetermined time (see K2 in FIG. 3) at which the temperature rise in the electrifying line 51 saturates due to electrifying the ECU 50 (see time point t2-2 in FIG. 3).

(2) The above embodiment is illustrated such that, upon decision that the ECU (load) 50 is in the non-electrifying state, the latch reset circuit 24 (the non-electrify state decision circuit) generates the latch reset signal Res so as to turn off the semiconductor switch 30 and put the control circuit 20 itself in the inactive state through the bypass circuit 40. The present invention is not limited to this. The latch reset circuit 24 may directly, i.e. not through the bypass circuit 40, turn off the semiconductor switch 30 and the transistor Tr5 so as to put the control circuit 20 itself in the inactive state.

(3) The above embodiment is illustrated such that when the ECU (load) 50 is in the electrifying state, the transistor Tr5 is turned on so that the bypass 45 is shut off. The bypass 45 may be not shut off when the ECU 50 is in the electrifying state.

Even in this case, power consumption in the semiconductor switch 30 etc. can be saved when the ECU 50 is in the standby state.

(4) In the above embodiment, the configuration of the decision circuit 41 is not limited to what is illustrated in FIG. 2. It is only essential for the electrifying decision circuit 41 to generate the activation signal for activating the control circuit 20 in accordance with the load being put in the operation state. For example, the transistor Tr3 may be configured by an N-channel FET. In this case, the voltage between the resistor R2 and the transistor Tr2 will be applied to the gate of the transistor Tr3.

(5) The above embodiment is illustrated such that the electric power supply control circuit 10 is power saved when the ECU as the load is in the standby state. The present invention may be applied also to a case where the electric power supply control circuit 10 is power saved when the load is in the non-electrifying state.

The invention claimed is:

1. An electric power supply control circuit to be connected to an electrifying line that supplies electric power from a power source to a load, the electric power supply control circuit including a semiconductor switch and a control circuit, the semiconductor switch being for turning on and off supply of the electric power, and the control circuit being for controlling turning on and off of the semiconductor switch while protecting the semiconductor switch and the electrifying line; the electric power supply control circuit comprising:
    a bypass circuit connected in parallel with the semiconductor switch, wherein, upon the control circuit being in an inactive state while the load being in a non-electrifying state or in a standby state, the bypass circuit connects the power source to the load,
    wherein:
    the bypass circuit includes a electrifying decision circuit that generates an activation signal for activating the control circuit in accordance with the load being put in an operation state, wherein the electrifying decision circuit supplies the activation signal to the control circuit so as to turn on the semiconductor switch and allow electric power supply to the load through the electrifying line.

2. The electric power supply control circuit according to claim 1, wherein:
    the bypass circuit includes a bypass provided between the power source and the load; and
    upon a pass voltage formed in the bypass having a value within a predetermined range, the electrifying decision circuit generates the activation signal.

3. The electric power supply control circuit according to claim 2, wherein:
    the bypass includes a resistor; and
    the resistor forms the pass voltage.

4. The electric power supply control circuit according to claim 3, wherein:
    the bypass further includes a capacitor that is connected in parallel with the resistor.

5. The electric power supply control circuit according to claim 3, wherein:
    the resistor has a resistance value for being capable of limiting a current passing through the electrifying line so that the current is equal to or lower than a current value at which the current does not damage the electrifying line in case the load is short-circuited.

6. The electric power supply control circuit according to claim 2, wherein:
    the bypass circuit includes a pass shut-off device for shutting off the bypass; and
    the control circuit protects the semiconductor switch and the electrifying line in accordance with a current passing through the semiconductor switch; and
    upon activation by the activation signal, the control circuit turns on the semiconductor switch and, thereafter, controls the pass shut-off device to shut off the bypass.

7. The electric power supply control circuit according to claim 2, wherein:
    the bypass circuit further includes:
        a circuit shut-off device for shutting off the bypass circuit; and
        a bypass inhibiting circuit for controlling the circuit shut-off device in accordance with a predetermined instruction signal to shut off the bypass circuit.

8. The electric power supply control circuit according to claim 1, wherein:
    the control circuit includes a non-electrifying decision circuit that, upon decision that the load is in the non-electrifying state or in the standby state, turns on the semiconductor switch so as to put the control circuit itself in the inactive state.

9. The electric power supply control circuit according to claim 8, wherein:
    the non-electrifying decision circuit decides the non-electrifying state or the standby state of the load by a load command signal that puts the load in the non-electrifying state or in the standby state.

10. The electric power supply control circuit according to claim 8, wherein:
    the control circuit includes a current detection circuit for detecting a load current to the load; and
    the non-electrifying decision circuit decides the non-electrifying state or the standby state of the load by the detected load current being equal to or lower than a threshold current.

11. The electric power supply control circuit according to claim 8, wherein:
    the control circuit includes a temperature calculation circuit for calculating temperature rise in the electrifying line from the amount of the load current; and
    the non-electrifying decision circuit decides the non-electrifying state or the standby state of the load by the temperature rise calculation value in the electrifying line being equal to or less than a threshold on or after a predetermined time at which the temperature rise in the electrifying line saturates due to electrifying the load.

* * * * *

UNITED STATES PATENT AND TRADEMARK OFFICE
CERTIFICATE OF CORRECTION

PATENT NO. : 8,754,551 B2  
APPLICATION NO. : 13/123389  
DATED : June 17, 2014  
INVENTOR(S) : Furuichi et al.

Page 1 of 1

It is certified that error appears in the above-identified patent and that said Letters Patent is hereby corrected as shown below:

On the title page

Item (73) delete "Autonetworks Technologies, Mie (JP);
 Sumitomo Wiring Systems, Ltd., Mie (JP);
 Sumitomo Electric Industries, Ltd., Osaka (JP)"

Insert -- Autonetworks Technologies, Ltd., Mie (JP)
 Sumitomo Wiring Systems, Ltd., Mie (JP)
 Sumitomo Electric Industries, Ltd., Osaka (JP) --

Signed and Sealed this
Twenty-second Day of March, 2016

Michelle K. Lee
*Director of the United States Patent and Trademark Office*